United States Patent
Zhao et al.

(10) Patent No.: US 9,023,922 B2
(45) Date of Patent: May 5, 2015

(54) FLAME RETARDANT COMPOSITIONS, ARTICLES COMPRISING THE SAME AND METHODS OF MANUFACTURE THEREOF

(71) Applicant: SABIC Innovative Plastics IP B.V., Bergen op Zoom (NL)

(72) Inventors: Wei Zhao, Mt. Vernon, IN (US); Vikram Daga, Evansville, IN (US); Amit Kulkarni, Evansville, IN (US)

(73) Assignee: SABIC Global Technologies B.V. (NL)

( * ) Notice: Subject to any disclaimer, the term of this patent is extended or adjusted under 35 U.S.C. 154(b) by 0 days.

(21) Appl. No.: 13/900,058

(22) Filed: May 22, 2013

(65) Prior Publication Data

US 2013/0317149 A1    Nov. 28, 2013

Related U.S. Application Data

(60) Provisional application No. 61/651,487, filed on May 24, 2012, provisional application No. 61/651,481, filed on May 24, 2012, provisional application No. 61/700,164, filed on Sep. 12, 2012.

(51) Int. Cl.
*C08K 5/5399* (2006.01)
*C08L 69/00* (2006.01)
*C08L 67/04* (2006.01)

(52) U.S. Cl.
CPC *C08L 69/00* (2013.01); *C08L 67/04* (2013.01)

(58) Field of Classification Search
CPC ............................. C08K 5/523; C08K 5/5399
USPC .................................................. 524/127, 138
See application file for complete search history.

(56) References Cited

U.S. PATENT DOCUMENTS

| | | |
|---|---|---|
| 3,792,117 A | 2/1974 | Kolodchin et al. |
| 3,859,249 A | 1/1975 | McNeely |
| 3,865,783 A | 2/1975 | Clutter |
| 4,042,561 A | 8/1977 | DeEdwardo et al. |
| 4,111,883 A | 9/1978 | Victor |
| 4,117,041 A | 9/1978 | Guschl |
| 5,174,923 A | 12/1992 | Chen et al. |
| 5,856,380 A | 1/1999 | Bauer et al. |
| 5,965,627 A | 10/1999 | Allcock et al. |
| 6,403,755 B1 | 6/2002 | Stewart et al. |
| 6,433,082 B1 | 8/2002 | Eckel et al. |
| 6,528,559 B1 | 3/2003 | Nakacho et al. |
| 6,562,887 B1 | 5/2003 | Kurasawa et al. |
| 6,596,893 B2 | 7/2003 | Nakacho et al. |
| 6,630,524 B1 | 10/2003 | Lim et al. |
| 6,632,891 B1 | 10/2003 | Tada et al. |
| 6,723,864 B2 | 4/2004 | Silva et al. |
| 6,727,312 B1 | 4/2004 | Nodera |
| 6,737,453 B2 | 5/2004 | Sumimoto et al. |
| 6,747,078 B1 | 6/2004 | Eckel et al. |
| 6,790,886 B2 | 9/2004 | Harashina et al. |
| 6,790,887 B1 | 9/2004 | Nishihara |
| 6,946,578 B2 | 9/2005 | Nakano et al. |
| 6,949,596 B2 | 9/2005 | Seidel et al. |
| 6,969,745 B1 | 11/2005 | Taraiya et al. |
| 7,094,819 B2 | 8/2006 | Kakegawa et al. |
| 7,169,534 B2 | 1/2007 | Baumann et al. |
| 7,169,836 B2 | 1/2007 | Harashina et al. |
| 7,247,666 B2 | 7/2007 | Urabe et al. |
| 7,317,046 B2 | 1/2008 | Fukuoka et al. |
| 7,341,783 B2 | 3/2008 | Tokiwa |
| 7,365,815 B2 | 4/2008 | Hino et al. |
| 7,462,662 B2 | 12/2008 | Balfour et al. |
| 7,468,408 B2 | 12/2008 | Onishi et al. |
| 7,531,664 B2 | 5/2009 | Troutman et al. |
| 7,659,332 B2 | 2/2010 | Kang et al. |
| 7,691,924 B2 | 4/2010 | Lim et al. |
| 7,695,815 B2 | 4/2010 | Agarwal et al. |
| 7,759,418 B2 | 7/2010 | Murakami et al. |
| 7,767,736 B2 | 8/2010 | Baran, Jr. |
| 7,799,855 B2 | 9/2010 | Ebeling et al. |
| 7,863,382 B2* | 1/2011 | Ishii et al. ...................... 525/190 |
| 7,915,441 B2 | 3/2011 | Fushimi |
| 7,985,788 B2 | 7/2011 | Shinagawa et al. |
| 8,039,132 B2 | 10/2011 | Shimizu et al. |
| 8,053,500 B2 | 11/2011 | Morimoto et al. |

(Continued)

FOREIGN PATENT DOCUMENTS

| | | |
|---|---|---|
| CA | 2335948 A1 | 1/2000 |
| CN | 101142089 A | 3/2008 |

(Continued)

OTHER PUBLICATIONS

JP2012-111925 Patent Abstracts of Japan—Jun. 14, 2012 (1 page; Abstract only).
Invitation to Pay Additional Fees for International Application No. PCT/IB2013/054306; International filing date May 24, 2013; Issued Oct. 18, 2013 (8 pages).
Invitation to Pay Additional Fees for International Application No. PCT/IB2013/054315; International filing date May 24, 2013; Issued Oct. 9, 2013 (6 pages).
International Search Report for International Application No. PCT/IB2013/054316; International filing date May 24, 2013; Issued Oct. 4, 2013. (5 pages).
International Search Report for International Application No. PCT/IB2013/054322; International Filing Date May 24, 2013; Issued Sep. 20, 2013 (5 pgs).

(Continued)

*Primary Examiner* — Peter Szekely
(74) *Attorney, Agent, or Firm* — Cantor Colburn LLP

(57) ABSTRACT

Disclosed herein is a flame retardant composition comprising a polycarbonate; a polylactide; and a flame retardant; where the flame retardant is a phenoxyphosphazene, a di- or polyfunctional aromatic phosphorus-containing compound, or a combination comprising at least one of the foregoing flame retardants. Disclosed herein is a method comprising blending a polycarbonate, a polylactide and a flame retardant to form a flame retardant composition; where the flame retardant is a phenoxyphosphazene, a di- or polyfunctional aromatic phosphorus-containing compound, or a combination comprising at least one of the foregoing flame retardants.

32 Claims, No Drawings

(56) References Cited

U.S. PATENT DOCUMENTS

| | | | |
|---|---|---|---|
| 8,058,333 B1* | 11/2011 | Chang et al. | 524/138 |
| 8,063,245 B2 | 11/2011 | Okada et al. | |
| 8,399,546 B2 | 3/2013 | Li et al. | |
| 2002/0193027 A1 | 12/2002 | Dana et al. | |
| 2003/0083442 A1 | 5/2003 | Nishihara et al. | |
| 2003/0092802 A1* | 5/2003 | Nakacho et al. | 524/86 |
| 2003/0109612 A1 | 6/2003 | Seidel et al. | |
| 2004/0039145 A1 | 2/2004 | Silva et al. | |
| 2005/0182165 A1 | 8/2005 | Ma et al. | |
| 2005/0228087 A1 | 10/2005 | Murakami et al. | |
| 2005/0245670 A1* | 11/2005 | Sato | 524/537 |
| 2006/0079612 A1 | 4/2006 | Troutman et al. | |
| 2006/0223913 A1 | 10/2006 | Osada | |
| 2006/0276582 A1* | 12/2006 | Mochizuki et al. | 524/537 |
| 2006/0293414 A1 | 12/2006 | Gorny et al. | |
| 2007/0040154 A1 | 2/2007 | Murakami | |
| 2007/0149661 A1 | 6/2007 | Charati et al. | |
| 2007/0155873 A1 | 7/2007 | Kang et al. | |
| 2007/0191518 A1 | 8/2007 | Chen et al. | |
| 2008/0188597 A1 | 8/2008 | Moriyama et al. | |
| 2009/0023351 A1 | 1/2009 | Kashihara et al. | |
| 2009/0170983 A1* | 7/2009 | Tada et al. | 524/95 |
| 2009/0292048 A1 | 11/2009 | Li et al. | |
| 2010/0036054 A1 | 2/2010 | Hutchings et al. | |
| 2010/0081739 A1* | 4/2010 | Warth et al. | 524/86 |
| 2010/0129649 A1 | 5/2010 | Malinoski et al. | |
| 2010/0139944 A1 | 6/2010 | Guo et al. | |
| 2010/0152344 A1 | 6/2010 | van den Bogerd et al. | |
| 2010/0222244 A1 | 9/2010 | Maccone et al. | |
| 2010/0233486 A1 | 9/2010 | Inoue et al. | |
| 2010/0261818 A1 | 10/2010 | Seki | |
| 2011/0086225 A1 | 4/2011 | Takagi et al. | |
| 2011/0118395 A1 | 5/2011 | Kiuchi et al. | |
| 2011/0130497 A1* | 6/2011 | Su et al. | 524/120 |
| 2011/0136979 A1 | 6/2011 | Cogen et al. | |
| 2011/0172423 A1 | 7/2011 | Fuchs et al. | |
| 2011/0218278 A1 | 9/2011 | Ikuno et al. | |
| 2011/0257296 A1 | 10/2011 | LaPointe et al. | |
| 2012/0021202 A1 | 1/2012 | Senda et al. | |
| 2012/0028047 A1 | 2/2012 | Imai et al. | |
| 2013/0131241 A1 | 5/2013 | van de Grampel et al. | |
| 2013/0137801 A1 | 5/2013 | Ha et al. | |
| 2013/0313419 A1 | 11/2013 | Nakazawa et al. | |

FOREIGN PATENT DOCUMENTS

| | | |
|---|---|---|
| CN | 1795238 B | 6/2010 |
| DE | 4433072 A1 | 3/1996 |
| DE | 10196566 B4 | 7/2008 |
| DE | 10393198 B4 | 6/2010 |
| DE | 10392639 | 9/2010 |
| DE | 10392639 B4 | 9/2010 |
| DE | 112004002030 | 12/2010 |
| DE | 112004002030 B4 | 12/2010 |
| EP | 00064752 A2 | 11/1982 |
| EP | 00064752 B1 | 11/1982 |
| EP | 214351 B1 | 3/1987 |
| EP | 0246620 A2 | 11/1987 |
| EP | 304296 B1 | 2/1989 |
| EP | 0376021 B1 | 7/1990 |
| EP | 0421747 A3 | 4/1991 |
| EP | 0421747 B1 | 4/1991 |
| EP | 528113 B1 | 2/1993 |
| EP | 0728811 A2 | 8/1996 |
| EP | 0728811 B1 | 8/1996 |
| EP | 562517 B1 | 8/1997 |
| EP | 806451 A1 | 11/1997 |
| EP | 0945478 A1 | 9/1999 |
| EP | 1069154 A1 | 1/2001 |
| EP | 1104766 A4 | 6/2001 |
| EP | 1548065 A1 | 6/2005 |
| EP | 1548065 B1 | 6/2005 |
| EP | 1603175 B1 | 11/2009 |
| EP | 1799766 B1 | 6/2010 |
| EP | 1799766 B8 | 6/2010 |
| EP | 1927151 B1 | 8/2011 |
| EP | 2390282 A1 | 11/2011 |
| GB | 1598819 A | 9/1981 |
| JP | 08081620 A | 3/1996 |
| JP | 2001002908 A | 1/2001 |
| JP | 2007045906 A | 2/2007 |
| JP | 2007070468 A | 3/2007 |
| JP | 2012001580 A | 1/2012 |
| JP | 2012111925 A | 6/2012 |
| KR | 10-0435571 B1 | 1/2003 |
| KR | 20030008811 | 1/2003 |
| KR | 20100070036 A | 6/2010 |
| WO | WO9910429 A1 | 3/1999 |
| WO | 03020827 A1 | 3/2003 |
| WO | 2004007611 | 1/2004 |
| WO | WO2005019231 A1 | 3/2005 |
| WO | WO2005073264 A1 | 8/2005 |
| WO | WO2006096033 A | 9/2006 |
| WO | 2009141799 A1 | 11/2009 |
| WO | 2010028785 A | 3/2010 |
| WO | WO2010053167 A1 | 5/2010 |
| WO | WO2010087193 A1 | 8/2010 |
| WO | 2010101041 | 9/2010 |
| WO | WO2010144615 A | 2/2011 |
| WO | WO2010144615 A2 | 2/2011 |
| WO | WO2011090211 A1 | 7/2011 |
| WO | WO2011090215 A1 | 7/2011 |
| WO | WO2011118102 A1 | 9/2011 |
| WO | WO2011122080 A1 | 10/2011 |
| WO | WO2011125906 A1 | 10/2011 |
| WO | WO2011136379 A | 11/2011 |
| WO | WO2011155119 | 12/2011 |
| WO | WO2011155119 A1 | 12/2011 |
| WO | 2012015109 A1 | 2/2012 |
| WO | 2012058821 A1 | 5/2012 |
| WO | 2013115151 A1 | 8/2013 |

OTHER PUBLICATIONS

International Search Report for International Application No. PCT/IB2013/054323, International Filing date May 24, 2013; Issued Oct. 17, 2013 (4 pages).

International Search Report for International Application No. PCT/IB2013/054310; International filing date May 24, 2013; Issued Sep. 16, 2013. (4 pages).

International Search Report for International Application No. PCT/IB2013/054315; International filing date May 24, 2013; Issued Nov. 20, 2013 (7 pages).

International Search Report for International Application No. PCT/IB2013/054324, International Filing date May 24, 2013; Issued Sep. 16, 2013 (4 pages).

International Search Report for International Application No. PCT/IB2013/054325, International Filing date May 24, 2013; Issued Sep. 20, 2013 (5 pages).

International Search Report for International Application No. PCT/US2013/042606, International Filing date May 24, 2013; Issued Sep. 9, 2013 (5 pages).

International Search Report for International Application No. PCT/US2013/042603, International Filing date May 24, 2013; Issued Sep. 11, 2013 (7 pages).

International Search Report for International Application No. PCT/US2013/042729; International Filing Date May 24, 2013; Issued Sep. 10, 2013 (5 pgs).

Machine Translation of CN101142089A. Mar. 12, 2008.

Written Opinion for International Application No. PCT/IB2013/042603; International filing date May 24, 2013; Issued Sep. 11, 2013. (7 pages).

Written Opinion for International Application No. PCT/IB2013/054310; International filing date May 24, 2013; Issued Sep. 16, 2013. (4 pages).

Written Opinion for International Application No. PCT/IB2013/054315; International filing date May 24, 2013; Issued Nov. 20, 2013 (7 pages).

Written Opinion for International Application No. PCT/IB2013/054316; International filing date May 24, 2013; Issued Oct. 4, 2013. (5 pages).

(56) References Cited

OTHER PUBLICATIONS

Written Opinion for International Application No. PCT/IB2013/054322; International filing date May 24, 2013; Issued Sep. 20, 2013; (5 pages).
Written Opinion for Intenational Application No. PCT/IB2013/054323; International filing date May 24, 2013; Issued Oct. 17, 2013. (3 pages).
Written Opinion for International Application No. PCT/IB2013/054324; International filing date May 24, 2013; Issued Sep. 19, 2013. (5 pages).
Written Opinion for International Application No. PCT/IB2013/054325; International Filing date May 24, 2013; Issued Sep. 20, 2013; (5 pages).
Written Opinion for International Application No. PCT/US2013/042606; International filing date May 24, 2013; Issued Sep. 9, 2013. (4 pages).
Written Opinion for International Application No. PCT/US2013/042729; International filing date May 24, 2013; Issued Sep. 10, 2013. (6 pages).
XP002712334 Database WPI Week 201058; Thomson Scientific, London, GB, AN 2010-H97109.
XP002713617 Database WPI Week 201205—Thomson Scientific, London, GB; AN—2012-A16221.
XP002713951 Database WPI Week 200340; Thomson Scientific, London, GB, AN 2003-427670.
XP002713952 Database WPI Week 200732; Thomson Scientific, London, GB, AN 2007-336264.
JP 2007-070468 A—Mar. 22, 2007—Machine translation (45 Pages).
KR 10-0435571 B1—Jan. 29, 2003—Machine Translation (16 Pages).
KR 10-435571 B1—Jan. 29, 2003—Abstract Only (1 page).
International Search Report for International Application No. PCT/IB2013/054306; International filing date May 24, 2013; Issued Dec. 13, 2013. (7 pages).
Written Opinion for International Application No. PCT/IB2013/054306; International filing date May 24, 2013; Issued Dec. 13, 2013. (11 pages).
Written Opinion for International Application No. PCT/US2013/042603; International filing date May 5, 2013; Issued Sep. 11, 2013. (7 pages).
XP002712333 Database WPI Week 201205; Thomson Scientific, London, AN 2012-A16221—Jun. 15, 2010 (2 Pages).
XP002712334 Database WPI Week 201058; Thomson Scientific, London, GB, AN 2010-H97109—Dec. 17, 2008 (2 pages).
XP002713617 Database WPI Week 201205—Thomson Scientific, London, GB; AN—2012-A16221—Jun. 15, 2010 (2 pages).
XP002713951 Database WPI Week 200340; Thomson Scientific, London, GB, AN 2003-427670—Jan. 29, 2003 (2 pages).
XP002713952 Database WPI Week 200732; Thomson Scientific, London, GB, AN 2007-336264—Feb. 22, 2007 (4 pages).
Machine Translation of JP 08-081620A. Mar. 26, 1996.
UL 94 AppGuide. MG Chemicals. http://www.mgchemicals.com/downloads/appguide/appguide1105.pdf. As viewed on Dec. 1, 2014. (1 page).
International Preliminary Report on Patentability for International Application No. PCT/IB2013/054306; International Filing Date May 24, 2013; Report Mail Date Dec. 4, 2014 (12 Pages).
International Preliminary Report on Patentability for International Application No. PCT/IB2013/054310; International Filing Date May 24, 2013; Report Mail Date Dec. 4, 2014 (6 Pages).
International Preliminary Report on Patentability for International Application No. PCT/IB2013/054315; International Filing Date May 24, 2013; Report Mail Date Dec. 4, 2014 (9 Pages).
International Preliminary Report on Patentability for International Application No. PCT/IB2013/054316; International Filing Date May 24, 2013; Report Mail Date Dec. 4, 2014 (6 Pages).
International Preliminary Report on Patentability for International Application No. PCT/IB2013/054322; International Filing Date May 24, 2013; Report Mail Date Dec. 4, 2014 (6 Pages).
International Preliminary Report on Patentability for International Application No. PCT/IB2013/054323; International Filing Date May 24, 2013; Report Mail Date Dec. 4, 2014 (5 Pages).
International Preliminary Report on Patentability for International Application No. PCT/IB2013/054324; International Filing Date May 24, 2013; Report Mail Date Dec. 4, 2014 (7 Pages).
International Preliminary Report on Patentability for International Application No. PCT/IB2013/054325; International Filing Date May 24, 2013; Report Mail Date Dec. 4, 2014 (6 Pages).
International Preliminary Report on Patentability for International Application No. PCT/US2013/042603; International Filing Date May 24, 2013; Report Mail Date Dec. 4, 2014 (9 Pages).
International Preliminary Report on Patentability for International Application No. PCT/US2013/042606; International Filing Date May 24, 2013; Report Mail Date Dec. 4, 2014 (6 Pages).
International Preliminary Report on Patentability for International Application No. PCT/US2013/042729; International Filing Date May 24, 2013; Report Mail Date Dec. 4, 2014 (8 Pages).

\* cited by examiner

FLAME RETARDANT COMPOSITIONS, ARTICLES COMPRISING THE SAME AND METHODS OF MANUFACTURE THEREOF

CROSS REFERENCE TO RELATED APPLICATIONS

This application claims priority to U.S. Provisional Application No. 61/651,487 filed on May 24, 2012, and to U.S. Provisional Application No. 61/651,481 filed on May 24, 2012, and to U.S. Provisional Application 61/700,164 filed on Sep. 12, 2012, the entire contents of which are hereby incorporated by reference.

BACKGROUND

This disclosure relates to flame retardant polycarbonate compositions, methods of manufacture thereof and to articles comprising the same.

In electronic and electrical devices such as notebook personal computers, e-books, and tablet personal computers, metallic body panels are being replaced by materials that are lighter in weight and offer a robust combination of mechanical properties. These lighter materials result in weight savings, cost savings and enable the manufacture of complex designs. While these lighter materials can be used to manufacture panels having thinner cross-sectional thicknesses, it is desirable to improve the stiffness of the material to prevent warping, while at the same time improve the impact resistance. It is also desirable to improve the flame retardancy of the material to reduce fire related hazards.

SUMMARY

Disclosed herein is a flame retardant composition comprising a polycarbonate; a polylactide; and a flame retardant; where the flame retardant is a phenoxyphosphazene, a di- or polyfunctional aromatic phosphorus-containing compound, or a combination comprising at least one of the foregoing flame retardants.

Disclosed herein is a method comprising blending a polycarbonate, a polylactide and a flame retardant to form a flame retardant composition; where the flame retardant is a phenoxyphosphazene, a di- or polyfunctional aromatic phosphorus-containing compound, or a combination comprising at least one of the foregoing flame retardants.

DETAILED DESCRIPTION

Disclosed herein is a flame retardant composition that comprises polycarbonate, polylactide and a phenoxyphosphazene flame retardant compounds. The flame retardant composition displays a suitable combination of stiffness and ductility as well as a low melt viscosity that renders it easily processable. The flame retardant composition can be used in electronics goods such as notebook personal computers, e-books, tablet personal computers, and the like.

In general, when one property of a polymeric composition is improved another property is degraded. For example, when impact resistance is improved, the elastic modulus is generally reduced. Similarly, when the flame retardancy of a polymeric composition is improved, the impact strength decreases. For instance, in U.S. Pat. No. 7,863,382 B2 Table 9, PC/PLA blends flame retardancy ranked as V-0, however the "surface impact" (Instrument impact) is only 11 joules at best. The disclosed flame retardant composition does not suffer from this drawback. It displays a unique combination of properties. In an embodiment, all of the compositions properties are simultaneously improved when the flame retardant is added to the other ingredients that produce the flame retardant composition. The flame retardant composition therefore displays a unique balance of properties.

Disclosed herein too is a method of manufacturing the flame retardant composition. The method comprises blending a polycarbonate, a polylactide and a flame retardant; where the flame retardant is a phenoxyphosphazene, a di- or polyfunctional aromatic phosphorus-containing compound, or a combination comprising at least one of the foregoing flame retardants. The blend may be molded into a desired shape.

A "polycarbonate" means compositions having repeating structural carbonate units of formula (1)

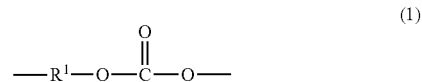

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

$$HO\text{-}A^1\text{-}Y^1\text{-}A^2\text{-}OH \qquad (2)$$

wherein each of $A^1$ and $A^2$ is a monocyclic divalent aromatic group and $Y^1$ is a single bond or a bridging group having one or more atoms that separate $A^1$ from $A^2$. In an embodiment, one atom separates $A^1$ from $A^2$. Specifically, each $R^1$ can be derived from a dihydroxy aromatic compound of formula (3)

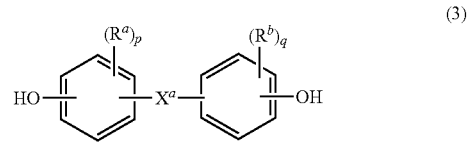

wherein $R^a$ and $R^b$ are each independently a hydrogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, $X^a$ is a $C_{1-18}$ alkylene group, a $C_{3-18}$ cycloalkylene group, a fused $C_{6-18}$ cycloalkylene group, or a group of the formula —$B^1$-G-$B^2$— wherein $B^1$ and $B^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

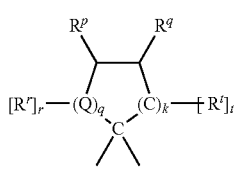

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols (4) can be used in the manufacture of polycarbonates containing phthalimidine carbonate units of formula (4a)

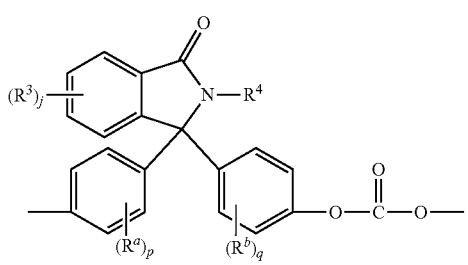

(4a)

wherein $R^a$, $R^b$, p, and q are as in formula (4), $R^3$ is each independently a $C_{1-6}$ alkyl group, j is 0 to 4, and $R_4$ is a $C_{1-6}$ alkyl, phenyl, or phenyl substituted with up to five $C_{1-6}$ alkyl groups. In particular, the phthalimidine carbonate units are of formula (4b)

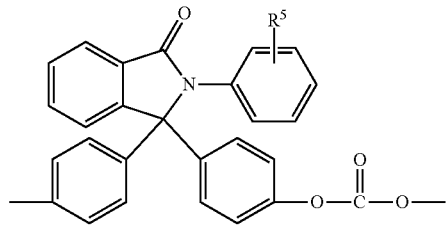

(4b)

wherein $R^5$ is hydrogen or a $C_{1-6}$ alkyl. In an embodiment, $R^5$ is hydrogen. Carbonate units (4a) wherein $R^5$ is hydrogen can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin carbonate units of formula (4c) and (4d)

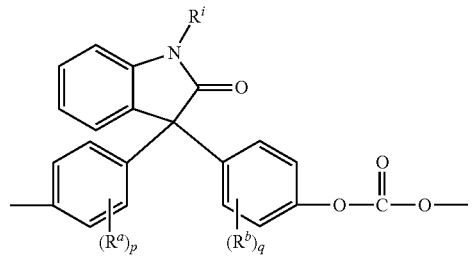

(4c)

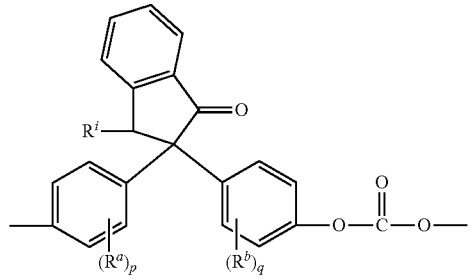

(4d)

wherein $R^a$ and $R^b$ are each independently $C_{1-12}$ alkyl, p and q are each independently 0 to 4, and $R^i$ is $C_{1-12}$ alkyl, phenyl, optionally substituted with 1 5 to $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{1-4}$ alkyl or phenyl.

Examples of bisphenol carbonate units derived from bisphenols (4) wherein $X^b$ is a substituted or unsubstituted $C_{3-18}$ cycloalkylidene include the cyclohexylidene-bridged, alkyl-substituted bisphenol of formula (4e)

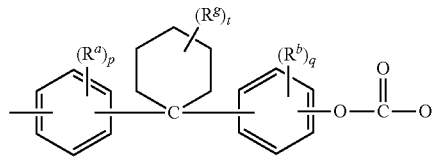

(4e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, r and s are each 0 or 1, and t is 0 or 3, specifically 0.

Examples of other bisphenol carbonate units derived from bisphenol (4) wherein $X^b$ is a substituted or unsubstituted $C_{3-18}$ cycloalkylidene include adamantyl units (4f) and units (4g)

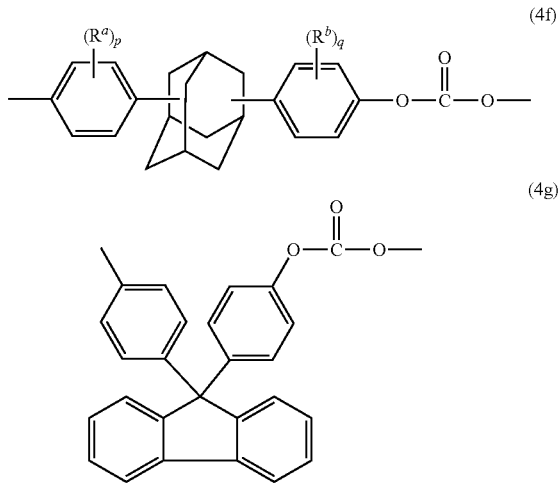

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1. In another specific embodiment, $R^a$, $R^b$ are each methyl, p and q are each 0 or 1. Carbonates containing units (4a) to (4g) are useful for making polycarbonates with high glass transition temperatures (Tg) and high heat distortion temperatures.

Other useful aromatic dihydroxy compounds of the formula HO—$R^1$—OH include compounds of formula (6)

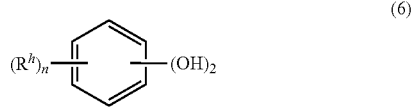

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or a combination comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-2-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

"Polycarbonates" includes homopolycarbonates (wherein each $R^1$ in the polymer is the same), copolymers comprising different $R^1$ moieties in the carbonate ("copolycarbonates"), copolymers comprising carbonate units and other types of polymer units, such as ester units, and combinations comprising at least one of homopolycarbonates and/or copolycarbonates.

A specific type of copolymer is a polyester carbonate, also known as a polyester-polycarbonate. Such copolymers further contain, in addition to recurring carbonate chain units of formula (1), repeating units of formula (7)

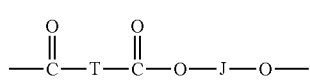

(7)

wherein J is a divalent group derived from a dihydroxy compound, and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically 2, 3, or 4 carbon atoms; and T is a divalent group derived from a dicarboxylic acid, and can be, for example, a $C_{2-10}$ alkylene, a $C_{6-20}$ cycloalkylene, or a $C_{6-20}$ arylene. Copolyesters containing a combination of different T and/or J groups can be used. The polyesters can be branched or linear.

In an embodiment, J is a $C_{2-30}$ alkylene group having a straight chain, branched chain, or cyclic (including polycyclic) structure. In another embodiment, J is derived from an aromatic dihydroxy compound of formula (3) above. In another embodiment, J is derived from an aromatic dihydroxy compound of formula (4) above. In another embodiment, J is derived from an aromatic dihydroxy compound of formula (6) above.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In another specific embodiment, J is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate is derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

Polycarbonates can be manufactured by processes such as interfacial polymerization and melt polymerization. Although the reaction conditions for interfacial polymerization can vary, a process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt % based on the weight of bisphenol in the phosgenation mixture. In another embodiment an effective amount of phase transfer catalyst can be 0.5 to 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol;

and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing esters. In addition, useful transesterification catalysts can include phase transfer catalysts of formula $(R^3)_4Q^+X$, wherein each $R^3$, Q, and X are as defined above. transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The polyester-polycarbonates can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

In addition to the polycarbonates described above, combinations of the polycarbonate with other thermoplastic polymers, for example combinations of homopolycarbonates and/or polycarbonate copolymers with polyesters, can be used. Useful polyesters can include, for example, polyesters having repeating units of formula (7), which include poly(alkylene dicarboxylates), liquid crystalline polyesters, and polyester copolymers. The polyesters described herein are generally completely miscible with the polycarbonates when blended.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). A branched polyester, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester, depending on the ultimate end use of the composition.

Useful polyesters can include aromatic polyesters, poly (alkylene esters) including poly(alkylene arylates), and poly (cycloalkylene diesters). Aromatic polyesters can have a polyester structure according to formula (7), wherein J and T are each aromatic groups as described hereinabove. In an embodiment, useful aromatic polyesters can include, for example, poly(isophthalate-terephthalate-resorcinol) esters, poly(isophthalate-terephthalate-bisphenol A) esters, poly [(isophthalate-terephthalate-resorcinol) ester-co-(isophthalate-terephthalate-bisphenol A)]ester, or a combination comprising at least one of these. Also contemplated are aromatic polyesters with a minor amount, e.g., 0.5 to 10 weight percent, based on the total weight of the polyester, of units derived from an aliphatic diacid and/or an aliphatic polyol to make copolyesters. Poly(alkylene arylates) can have a polyester structure according to formula (7), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups J include, for example, ethylene, 1,4-butylene, and bis-(alkylene-disubstituted cyclohexane) including cis- and/or trans-1,4-(cyclohexylene)dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A specifically useful poly(cycloalkylene diester) is poly(cyclohexanedimethylene terephthalate) (PCT). Combinations comprising at least one of the foregoing polyesters can also be used.

Copolymers comprising alkylene terephthalate repeating ester units with other ester groups can also be useful. Specifically useful ester units can include different alkylene terephthalate units, which can be present in the polymer chain as individual units, or as blocks of poly(alkylene terephthalates). Copolymers of this type include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (9)

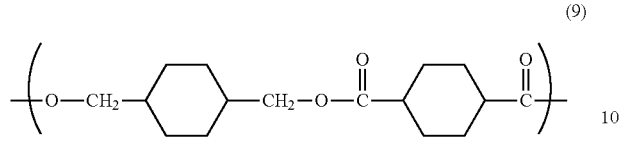

wherein, as described using formula (7), J is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

The polycarbonate and polyester can be used in a weight ratio of 1:99 to 99:1, specifically 10:90 to 90:10, and more specifically 30:70 to 70:30, depending on the function and properties desired.

It is desirable for such a polyester and polycarbonate blend to have an MVR of 5 to 150 cc/10 min., specifically 7 to 125 cc/10 min, more specifically 9 to 110 cc/10 min, and still more specifically 10 to 100 cc/10 min., measured at 300° C. and a load of 1.2 kilograms according to ASTM D1238-04.

The polycarbonate may also be blended with other polymers. Examples of other polymers that can be blended with the polycarbonate includes polyacetals, polyolefins, polyacrylics, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, or the like, or a combination comprising at least one of the foregoing organic polymers.

In an exemplary embodiment, the polycarbonate may comprise a blend of polycarbonate homopolymers—i.e., a first polycarbonate polymer and a second polycarbonate polymer. The first polycarbonate homopolymer has a molecular weight of 15,000 to 25,000 Daltons, specifically 18,000 to 23,000 Daltons, and more specifically 20,000 to 22,500 Daltons, when measured using gel permeation chromatography (GPC) with a polycarbonate standard. The first polycarbonate homopolymer is present in an amount of 15 to 55, specifically 19 to 50 wt % based on the total weight of the flame retardant composition.

The second polycarbonate homopolymer has a molecular weight of 25,000 to 40,000 Daltons, specifically 27,000 to 35,000 Daltons, and more specifically 28,000 to 32,500 Daltons, when measured using gel permeation chromatography (GPC) with a polycarbonate standard. The second polycarbonate homopolymer is present in an amount of 15 to 55, specifically 16 to 45 wt % based on the total weight of the flame retardant composition.

The polycarbonate can be present in an amount of 30 to 80 wt %, specifically in an amount of 35 to 75 wt %, and more specifically in an amount of 50 to 66 wt %, based on the total weight of the flame retardant composition.

The composition further comprises a polysiloxane-polycarbonate copolymer, also referred to as a polysiloxane-polycarbonate. The polydiorganosiloxane (also referred to herein as "polysiloxane") blocks of the copolymer comprise repeating diorganosiloxane units as in formula (10)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer.

The value of E in formula (10) can vary widely depending on the type and relative amount of each component in the flame retardant composition, the desired properties of the composition, and like considerations. Generally, E has an average value of 2 to 1,000, specifically 2 to 500, or 2 to 200, more specifically 5 to 100. In an embodiment, E has an average value of 10 to 75, and in still another embodiment, E has an average value of 40 to 60. Where E is of a lower value, e.g., less than 40, it can be desirable to use a relatively larger amount of the polycarbonate-polysiloxane copolymer. Conversely, where E is of a higher value, e.g., greater than 40, a relatively lower amount of the polycarbonate-polysiloxane copolymer can be used.

A combination of a first and a second (or more) polycarbonate-polysiloxane copolymers can be used, wherein the average value of E of the first copolymer is less than the average value of E of the second copolymer.

In an embodiment, the polydiorganosiloxane blocks are of formula (11)

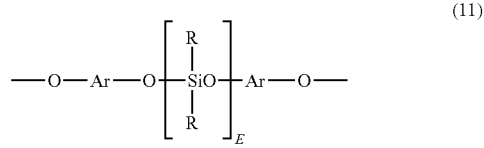

wherein E is as defined above; each R can be the same or different, and is as defined above; and Ar can be the same or different, and is a substituted or unsubstituted $C_6$-$C_{30}$ arylene group, wherein the bonds are directly connected to an aromatic moiety. Ar groups in formula (11) can be derived from a $C_6$-$C_{30}$ dihydroxyarylene compound, for example a dihydroxyarylene compound of formula (3) or (6) above. Dihydroxyarylene compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl) n-butane, 2,2-bis(4-hydroxy-1-methylphenyl)propane, 1,1-bis(4-hydroxyphenyl) cyclohexane, bis(4-hydroxyphenyl sulfide), and 1,1-bis(4-hydroxy-t-butylphenyl)propane. Combinations comprising at least one of the foregoing dihydroxy compounds can also be used.

In another embodiment, polydiorganosiloxane blocks are of formula (13)

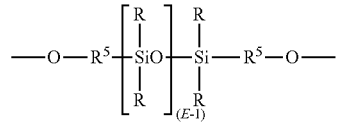

(13)

wherein R and E are as described above, and each $R^5$ is independently a divalent $C_1$-$C_{30}$ organic group, and wherein the polymerized polysiloxane unit is the reaction residue of its corresponding dihydroxy compound. In a specific embodiment, the polydiorganosiloxane blocks are of formula (14):

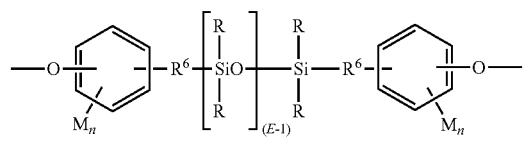

(14)

wherein R and E are as defined above. $R^6$ in formula (14) is a divalent $C_2$-$C_8$ aliphatic group. Each M in formula (14) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

Specific polydiorganosiloxane blocks are of the formula

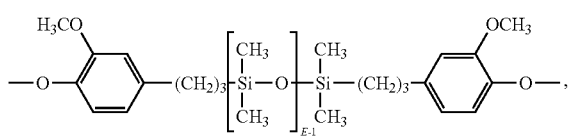

(14a)

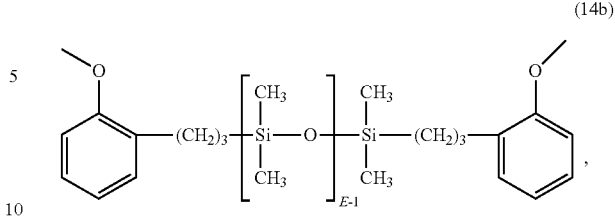

(14b)

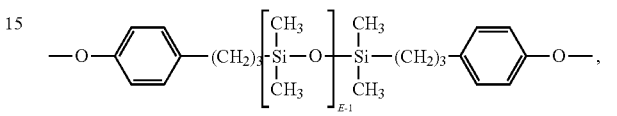

(14c)

or a combination comprising at least one of the foregoing, wherein E has an average value of 2 to 200, 2 to 125, 5 to 125, 5 to 100, 5 to 50, 20 to 80, or 5 to 20.

Blocks of formula (14) can be derived from the corresponding dihydroxy polydiorganosiloxane (15)

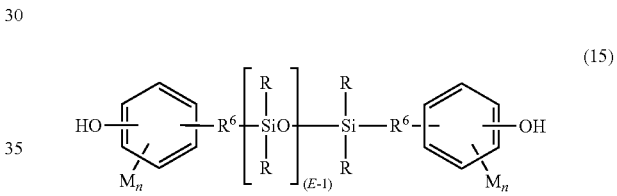

(15)

wherein R, E, M, $R^6$, and n are as described above. Such dihydroxy polysiloxanes can be made by effecting a platinum-catalyzed addition between a siloxane hydride of formula (16)

(16)

wherein R and E are as previously defined, and an aliphatically unsaturated monohydric phenol. aliphatically unsaturated monohydric phenols include eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations comprising at least one of the foregoing can also be used.

In an embodiment, an exemplary polysiloxane-polycarbonate block copolymer is one having the structure shown in the Formula (17) below:

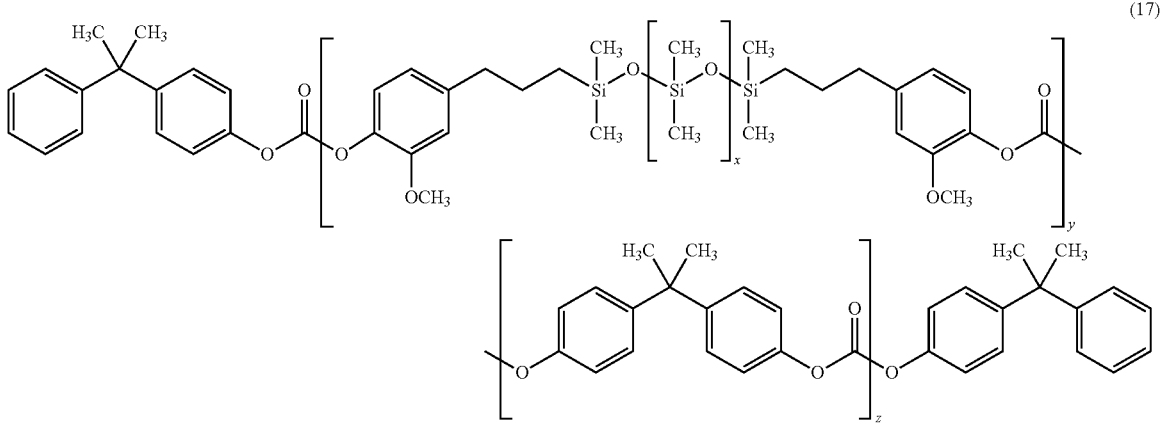

(17)

where the polysiloxane blocks are endcapped with eugenol, where x is 1 to 100, specifically 5 to 85, specifically 10 to 70, specifically 15 to 65, and more specifically 40 to 60. In an embodiment, y is 1 to 90 and z is 1 to 600. The polysiloxane block may be randomly distributed or controlled distributed amongst the polycarbonate blocks. In an embodiment, x is 30 to 50, y is 10 to 30 and z is 450 to 600.

When the polysiloxane polycarbonate copolymer comprises eugenol endcapped polysiloxane, the flame retardant composition comprises up to 25 wt % of the polysiloxane-polycarbonate copolymer. The polysiloxane content is 0 to 20 wt %, specifically 1 to 16 wt %, specifically 2 to 14 wt %, and more specifically 3 to 6 wt %, based on the total weight of the polysiloxane-polycarbonate copolymer. In an embodiment, the number average molecular weight of the polysiloxane block is 5,000 to 30,000 Daltons using a bisphenol A polycarbonate absolute molecular weight standards.

In an embodiment, the polysiloxane-polycarbonate copolymer comprises 10 wt % or less, specifically 6 wt % or less, and more specifically 4 wt % or less, of the polysiloxane based on the total weight of the polysiloxane-polycarbonate copolymer. Polysiloxane-polycarbonate copolymers containing 10 wt % or less are generally optically transparent and are sometimes referred to as EXL-T as commercially available from Sabic Innovative Plastics.

In another embodiment, the polysiloxane-polycarbonate copolymer comprises 10 wt % or more, specifically 12 wt % or more, and more specifically 14 wt % or more, of the polysiloxane copolymer based on the total weight of the polysiloxane-polycarbonate copolymer. Polysiloxane-polycarbonate copolymers containing 10 wt % or more are generally optically opaque and are sometimes referred to as EXL-P as commercially available from Sabic Innovative Plastics.

The polysiloxane-polycarbonate copolymer can comprise 50 to 99 weight percent of polycarbonate and 1 to 50 weight percent polysiloxane, based on the total weight of the polysiloxane-polycarbonate copolymer. Within this range, the polysiloxane-polycarbonate copolymer can comprise 70 to 98 weight percent, more specifically 75 to 97 weight percent of polycarbonate and 2 to 30 weight percent, more specifically 3 to 25 weight percent polysiloxane, based on the total weight of the polysiloxane-polycarbonate copolymer.

Polysiloxane-polycarbonate copolymers can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polysiloxane-polycarbonates of different flow properties can be used to achieve the overall desired flow property.

The flame retardant composition can further include impact modifier(s). These impact modifiers include elastomer-modified graft copolymers comprising (i) an elastomeric (i.e., rubbery) polymer substrate having a Tg less than or equal to 10° C., more specifically less than or equal to −10° C., or more specifically −40° to −80° C., and (ii) a rigid polymeric superstrate grafted to the elastomeric polymer substrate. As is known, elastomer-modified graft copolymers can be prepared by first providing the elastomeric polymer, then polymerizing the constituent monomer(s) of the rigid phase in the presence of the elastomer to obtain the graft copolymer. The grafts can be attached as graft branches or as shells to an elastomer core. The shell can merely physically encapsulate the core, or the shell can be partially or essentially completely grafted to the core.

Materials for use as the elastomer phase include, for example, conjugated diene rubbers; copolymers of a conjugated diene with less than or equal to 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Conjugated diene monomers for preparing the elastomer phase include those of formula (18)

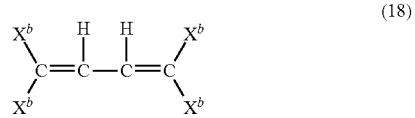

(18)

wherein each $X^b$ is independently hydrogen, $C_1$-$C_5$ alkyl, or the like. Examples of conjugated diene monomers that can be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as combinations comprising at least one of the foregoing conjugated diene monomers. Specific conjugated diene homopolymers include polybutadiene and polyisoprene.

Copolymers of a conjugated diene rubber can also be used, for example those produced by aqueous radical emulsion polymerization of a conjugated diene and at least one monomer copolymerizable therewith. Monomers that are useful for copolymerization with the conjugated diene include monovinylaromatic monomers containing condensed aromatic ring structures, such as vinyl naphthalene, vinyl anthracene, and the like, or monomers of formula (19)

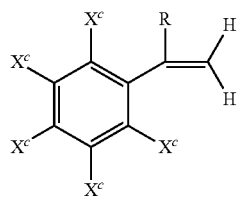

(19)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. monovinylaromatic monomers that can be used include styrene, 3-methylstyrene, 3,5-diethylstyrene, 4-n-propylstyrene, alpha-methylstyrene, alpha-methyl vinyltoluene, alpha-chloro styrene, alpha-bromostyrene, dichlorostyrene, dibromostyrene, tetra-chlorostyrene, and the like, and combinations comprising at least one of the foregoing compounds. Styrene and/or alpha-methylstyrene can be used as monomers copolymerizable with the conjugated diene monomer.

Other monomers that can be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (20)

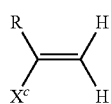

(20)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (18) include acrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Combinations of the foregoing monovinyl monomers and monovinylaromatic monomers can also be used.

(Meth)acrylate monomers for use in the elastomeric phase can be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers can optionally be polymerized in admixture with less than or equal to 15 wt % of comonomers of formulas (18), (19), or (20), based on the total monomer weight. comonomers include but are not limited to butadiene, isoprene, styrene, methyl methacrylate, phenyl methacrylate, phenethylmethacrylate, N-cyclohexylacrylamide, vinyl methyl ether or acrylonitrile, and combinations comprising at least one of the foregoing comonomers. Optionally, less than or equal to 5 wt % of a polyfunctional crosslinking comonomer can be present, based on the total monomer weight. Such polyfunctional crosslinking comonomers can include, for example, divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase can be polymerized by mass, emulsion, suspension, solution or combined processes such as bulk-suspension, emulsion-bulk, bulk-solution or other techniques, using continuous, semi-batch, or batch processes. The particle size of the elastomer substrate is not critical. For example, an average particle size of 0.001 to 25 micrometers, specifically 0.01 to 15 micrometers, or even more specifically 0.1 to 8 micrometers can be used for emulsion based polymerized rubber lattices. A particle size of 0.5 to 10 micrometers, specifically 0.6 to 1.5 micrometers can be used for bulk polymerized rubber substrates. Particle size can be measured by simple light transmission methods or capillary hydrodynamic chromatography (CHDF). The elastomer phase can be a particulate, moderately cross-linked conjugated butadiene or $C_{4-6}$ alkyl acrylate rubber, and specifically has a gel content greater than 70%. Also useful are combinations of butadiene with styrene and/or $C_{4-6}$ alkyl acrylate rubbers.

The elastomeric phase comprises 5 to 95 wt % of the total graft copolymer, more specifically 20 to 90 wt %, and even more specifically 40 to 85 wt % of the elastomer-modified graft copolymer, the remainder being the rigid graft phase.

The rigid phase of the elastomer-modified graft copolymer can be formed by graft polymerization of a combination comprising a monovinylaromatic monomer and optionally at least one comonomer in the presence of at least one elastomeric polymer substrates. The above-described monovinylaromatic monomers of formula (19) can be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Useful comonomers include, for example, the above-described monovinylic monomers and/or monomers of the general formula (18). In an embodiment, R is hydrogen or $C_1$-$C_2$ alkyl, and $X^c$ is cyano or $C_1$-$C_{12}$ alkoxycarbonyl. comonomers for use in the rigid phase include acrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase can vary widely depending on the type of elastomer substrate, type of monovinylaromatic monomer(s), type of comonomer(s), and the desired properties of the impact modifier. The rigid phase can generally comprise less than or equal to 100 wt % of monovinyl aromatic monomer, specifically 30 to 100 wt %, more specifically 50 to 90 wt % monovinylaromatic monomer, with the balance of the rigid phase being comonomer(s).

Depending on the amount of elastomer-modified polymer present, a separate matrix or continuous phase of ungrafted rigid polymer or copolymer can be simultaneously obtained along with the elastomer-modified graft copolymer. Typically, such impact modifiers comprise 40 to 95 wt % elastomer-modified graft copolymer and 5 to 65 wt % graft copolymer, based on the total weight of the impact modifier. In another embodiment, such impact modifiers comprise 50 to 85 wt %, more specifically 75 to 85 wt % rubber-modified graft copolymer, together with 15 to 50 wt %, more specifically 15 to 25 wt % graft copolymer, based on the total weight of the impact modifier.

In an embodiment, the aromatic vinyl copolymer comprises "free" styrene-acrylonitrile copolymer (SAN), i.e., styrene-acrylonitrile copolymer that is not grafted onto another polymeric chain. In a particular embodiment, the free styrene-acrylonitrile copolymer can have a molecular weight of 50,000 to 200,000 Daltons on a polystyrene standard molecular weight scale and can comprise various proportions of styrene to acrylonitrile. For example, free SAN can comprise 75 weight percent styrene and 25 weight percent acrylonitrile based on the total weight of the free SAN copolymer. Free SAN can optionally be present by virtue of the addition of a grafted rubber impact modifier in the composition that contains free SAN, and/or free SAN can by present independent of other impact modifiers in the composition.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched alkyl group and $R^e$ is a branched $C_3$-$C_{16}$ alkyl group; a first graft link monomer; a polymerizable alkenyl-containing organic material; and a second graft link monomer. The silicone rubber monomer can comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Branched acrylate rubber monomers include iso-octyl acrylate, 6-methyloctyl acrylate, 7-methyloctyl acrylate, 6-methylheptyl acrylate, and the like, or a combination comprising at least one of the foregoing. The polymerizable alkenyl-containing organic material can be, for example, a monomer of formula (18) or (19), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The first graft link monomer can be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The second graft link monomer is a polyethylenically unsaturated compound having at least one allyl group, such as allyl methacrylate, triallyl cyanurate, triallyl isocyanurate, and the like, or a combination comprising at least one of the foregoing.

The silicone-acrylate impact modifiers can be prepared by emulsion polymerization, wherein, for example a silicone rubber monomer is reacted with a first graft link monomer at a temperature from 30 to 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate can be reacted with a first graft link monomer such as (gamma-methacryloxypropyl)methyldimethoxysilane. A branched acrylate rubber monomer is then polymerized with the silicone rubber particles, optionally in presence of a cross linking monomer, such as allyl methacrylate, in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid can be separated from the aqueous phase through coagulation (by treatment with a coagulant) and dried to a fine powder to produce the silicone-acrylate rubber impact modifier. This method can be generally used for producing the silicone-acrylate impact modifier having a particle size of 100 nanometers to 2 micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semi-batch, or batch processes.

In an embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines such materials are commonly used as surfactants in emulsion polymerization, and can catalyze transesterification and/or degradation of polycarbonates. Instead, ionic sulfate, sulfonate or phosphate surfactants can be used in preparing the impact modifiers, particularly the elastomeric substrate portion of the impact modifiers. Useful surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, or a combination comprising at least one of the foregoing. A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers can be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers in addition to ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES). When present, impact modifiers can be present in the flame retardant composition in amounts of 3 to 25 wt %, specifically 4 to 15 wt %, based on the total weight of flame retardant composition.

In an embodiment, the flame retardant composition may contain reinforcing fillers. Examples of reinforcing fillers are glass fibers, carbon fibers, metal fibers, and the like.

The glass fibers may be flat or round fibers. Flat glass fibers have an elliptical cross-sectional area, while round fibers have a circular cross-sectional area, where the cross-sectional areas are measured perpendicular to the longitudinal axis of the fiber. The glass fibers may be manufactured from "E-glass," "A-glass," "C-glass," "D-glass," "R-glass," "S-glass," as well as E-glass derivatives that are fluorine-free and/or boron-free. The glass fibers may be woven or non-woven. The glass fibers can have a diameter of 3 micrometers to 25 micrometers, specifically 4 micrometers to 20 micrometers, and more specifically 8 micrometers to 15 micrometers.

The carbon fibers may be either carbon nanotubes or carbon fibers derived from pitch or polyacrylonitrile. The carbon nanotubes can be single wall carbon nanotubes or multiwall carbon nanotubes. The carbon nanotubes can have diameters of 2.5 nanometers to 100 nanometers and can have aspect ratios of 5 to 10,000. The aspect ratio is defined as the ratio of the length to the diameter.

The carbon fibers derived from pitch and polyacrylonitrile have a different microstructure from the carbon nanotubes. The carbon fibers can have a diameter of 3 micrometers to 25 micrometers, specifically 4 micrometers to 20 micrometers, and more specifically 8 micrometers to 15 micrometers and can have aspect ratios of 0.5 to 100.

The metal fibers can be whiskers (having diameters of less than 100 nanometers) or can have diameters in the micrometer regime. Metal fibers in the micrometer regime can have diameters of 3 to 30 micrometers. Exemplary metal fibers comprise stainless steel, aluminum, iron, nickel, copper, or the like, or a combination comprising at least one of the foregoing metals.

The flame retardant composition comprises the reinforcing fibers in an amount of 15 to 45 wt %, specifically 20 to 40 wt %, and more specifically 28 to 33 wt %, based on the total weight of the flame retardant composition.

The flame retardant composition may also comprise mineral fillers. In an embodiment, the mineral fillers serve as synergists. The synergist facilitates an improvement in the flame retardant properties when added to the flame retardant composition over a comparative composition that contains all of the same ingredients in the same quantities except for the synergist. Examples of mineral fillers are mica, talc, calcium carbonate, dolomite, wollastonite, barium sulfate, silica, kaolin, feldspar, barytes, or the like, or a combination comprising at least one of the foregoing mineral fillers. The mineral filler may have an average particle size of 0.1 to 20 micrometers, specifically 0.5 to 10 micrometers, and more specifically 1 to 3 micrometers.

The mineral filler is present in amounts of 0.1 to 20 wt %, specifically 0.5 to 15 wt %, and more specifically 1 to 5 wt %, based on the total weight of the flame retardant polycarbonate composition. An exemplay mineral filler is talc.

The flame retardant composition may also optionally contain additives such as antioxidants, antiozonants, stabilizers, thermal stabilizers, mold release agents, dyes, colorants, pigments, flow modifiers, or the like, or a combination comprising at least one of the foregoing additives.

As noted above, the flame retardant composition comprises a flame retarding agent. The flame retarding agent can be a phosphazene compound. In an embodiment, the flame retarding agent is a phenoxyphosphazene oligomer.

The phosphazene compound used in the flame retardant composition is an organic compound having a —P=N— bond in the molecule. In an embodiment, the phosphazene compound comprises at least one species of a cyclic phenoxy-phosphazene represented by the formula (21) below; a chain-like phenoxyphosphazene represented by the formula (22) below; or a crosslinked phenoxyphosphazene compound obtained by crosslinking at least one species of phenoxyphosphazene selected from those represented by the formulae (21) and (22) below, with a crosslinking group represented by the formula (23) below:

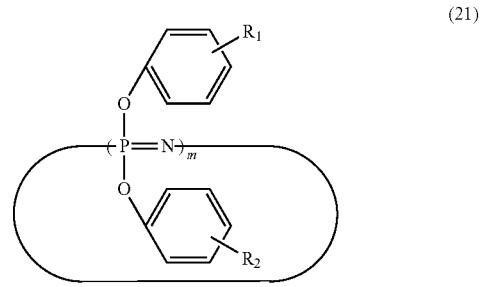

where in the formula (21), m represents an integer of 3 to 25, $R_1$ and $R_2$ are the same or different and are independently a hydrogen, a hydroxyl, a $C_{7-30}$ aryl group, a $C_{1-12}$ alkoxy, or a $C_{1-12}$ alkyl. A commercially available phenoxyphosphazene having the structure of formula (26) is FP-110® manufactured and distributed by Fushimi Pharmaceutical Co., Ltd.

The chainlike phenoxyphosphazene represented by the formula (22) below:

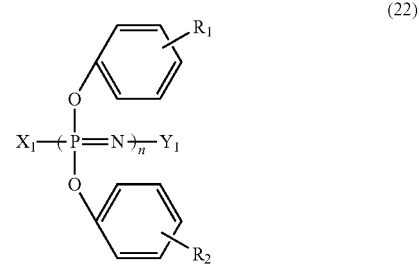

where in the formula (21), $X^1$ represents a —N=P(OPh)$_3$ group or a —N=P(O)OPh group, $Y^1$ represents a —P(OPh)$_4$ group or a —P(O)(OPh)$_2$ group, n represents an integer from 3 to 10000, Ph represents a phenyl group, $R_1$ and $R_2$ are the same or different and are independently a hydrogen, a hydroxyl, a $C_{1-12}$ alkoxy, or a $C_{1-12}$ alkyl. A commercially available phenoxyphosphazene having the structure of formula (27) is SPB-100® manufactured and distributed by Otsuka Chemical Co., Ltd.

The phenoxyphosphazenes may also have a crosslinking group represented by the formula (23) below:

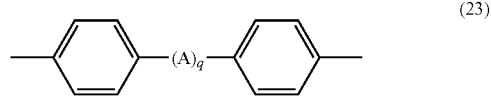

where in the formula (23), A represents —C(CH$_3$)$_2$—, —SO$_2$—, —S—, or —O—, and q is 0 or 1.

In an embodiment, the phenoxyphosphazene compound has a structure represented by the formula (24)

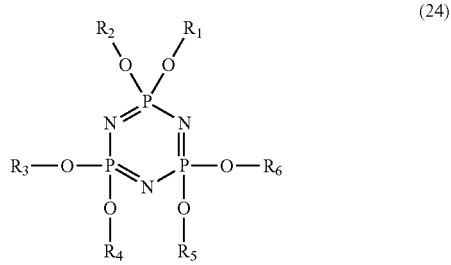
(24)

where R$_1$ to R$_6$ can be the same of different and can be an aryl group, an aralkyl group, a C$_{1-12}$ alkoxy, a C$_{1-12}$ alkyl, or a combination thereof.

In an embodiment, the phenoxyphosphazene compound has a structure represented by the formula (24)

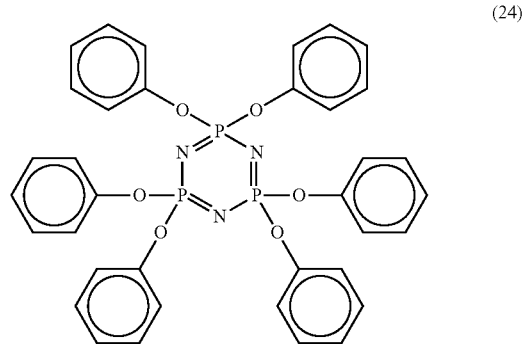
(24)

A commercially available phenoxyphosphazene having the structure of formula (24) is LY202® manufactured and distributed by Lanyin Chemical Co., Ltd.

The cyclic phenoxyphosphazene compound represented by the formula (21) may be exemplified by compounds such as phenoxy cyclotriphosphazene, octaphenoxy cyclotetraphosphazene, and decaphenoxy cyclopentaphosphazene, obtained by allowing ammonium chloride and phosphorus pentachloride to react at 120 to 130° C. to obtain a mixture containing cyclic and straight chain chlorophosphazenes, extracting cyclic chlorophosphazenes such as hexachloro cyclotriphosphazene, octachloro cyclotetraphosphazene, and decachloro cyclopentaphosphazene, and then substituting it with a phenoxy group. The cyclic phenoxyphosphazene compound may be a compound in which m in the formula (21) represents an integer of 3 to 8.

The chainlike phenoxyphosphazene compound represented by the formula (22) is exemplified by a compound obtained by subjecting hexachloro cyclotriphosphazene, obtained by the above-described method, to ring-opening polymerization at 220 to 250° C., and then substituting thus obtained chainlike dichlorophosphazene having a degree of polymerization of 3 to 10000 with phenoxy groups. The chain-like phenoxyphosphazene compound has a value of n in the formula (22) of 3 to 1000, specifically 5 to 100, and more specifically 6 to 25.

The crosslinked phenoxyphosphazene compound may be exemplified by compounds having a crosslinked structure of a 4,4'-diphenylene group, such as a compound having a crosslinked structure of a 4,4'-sulfonyldiphenylene (bisphenol S residue), a compound having a crosslinked structure of a 2,2-(4,4'-diphenylene) isopropylidene group, a compound having a crosslinked structure of a 4,4'-oxydiphenylene group, and a compound having a crosslinked structure of a 4,4'-thiodiphenylene group. The phenylene group content of the crosslinked phenoxyphosphazene compound is generally 50 to 99.9 wt %, and specifically 70 to 90 wt %, based on the total number of phenyl group and phenylene group contained in the cyclic phosphazene compound represented by the formula (21) and/or the chainlike phenoxyphosphazene compound represented by the formula (22). The crosslinked phenoxyphosphazene compound may be particularly preferable if it doesn't have any free hydroxyl groups in the molecule thereof. In an exemplary embodiment, the phosphazene compound comprises the cyclic phosphazene.

It is desirable for the flame retardant composition to comprise the phosphazene compound in an amount of 1 to 20 wt %, specifically 2 to 16 wt %, and more specifically 5 wt % to 14 wt %, based on the total weight of the flame retardant composition.

In lieu of or in addition to the phenoxyphosphazene flame retardants, useful flame retardants include organic compounds that include phosphorus (in other forms, i.e., that are not phosphazenes), bromine, and/or chlorine. Non-brominated and non-chlorinated phosphorus-containing flame retardants are desirable in certain applications for regulatory reasons, for example organic phosphates and organic compounds containing phosphorus-nitrogen bonds other than phosphazenes.

Flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), the bis(diphenyl) phosphate of hydroquinone and the bis(diphenyl) phosphate of bisphenol A, respectively, and their oligomeric and polymeric counterparts. Flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide.

When used, phosphorus-containing flame retardants are present in amounts of 1 to 30 wt %, specifically 2 to 20 wt %, and more specifically 2.5 wt % to 15 wt %, based on the total weight of the flame retardant composition, excluding any filler.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant.

When present, halogen containing flame retardants are present in amounts of 1 to 25 wt %, more specifically 2 to 20 wt %, based on the total weight of the flame retardant composition, excluding any filler.

Alternatively, the flame retardant composition can be essentially free of chlorine and bromine. "Essentially free of chlorine and bromine" is defined as having a bromine and/or chlorine content of less than or equal to 100 parts per million by weight (ppm), less than or equal to 75 ppm, or less than or equal to 50 ppm, based on the total parts by weight of the composition, excluding any filler.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoroanion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

In addition to the polycarbonate, the flame retardant composition can include various additives ordinarily incorporated into polymer compositions of this type, with the proviso that the additive(s) are selected so as to not significantly adversely affect the desired properties of the flame retardant composition, in particular the thermal and impact properties. Such additives can be mixed at a suitable time during the mixing of the components for forming the composition. additives include impact modifiers, fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.01 to 5 wt %, based on the total weight of the composition.

embodiment, the polylactide is a copolymer with the polycarbonate. In an exemplary embodiment, the polylactide is copolymerized with a polycarbonate, a polyester or a polycarbonate ester. Copolymers are discussed in detail below.

The polylactide is derived from the polymerization of L-lactic acid and/or D-lactic acid. Polylactides derived from the polymerization of L-lactic acid are called poly(L-lactide) (abbreviated as PLLA), while polylactides derived from the polymerization of D-lactic acid are called poly(D-lactide) (abbreviated as PDLA). The polylactides can comprise copolymers of polylactides.

The polymers that are copolymerized with the polylactide are derived from the polymerization of dihydroxy compounds (e.g., ethylene glycol, propylene glycol, butanediol, heptanediol, hexanediol, octanediol, nonanediol, decanediol, 1,4-cyclohexane dimethanol, neopentyl glycol, glycerin, pentaerythritol, bisphenol A, polyethylene glycol, polypropylene glycol, polytetramethylene glycol, or the like, or a combination comprising at least one of the foregoing dihydroxy compounds) with dicarboxylic acids (e.g., oxalic acid, adipic acid, sebacic acid, azelaic acid, dodecane dioic acid, malonic acid, glutaric acid, cyclohexane dicarboxylic acid, terephthalic acid, isophthalic acid, phthalic acid, naphthalene dicarboxylic acid, bis(p-carboxyphenyl)methane, anthracene dicarboxylic acid, 4,4'-diphenylether dicarboxylic acid, 5-sodium sulfoisophthalic acid and 5-tetrabutyl phosphonium isophthalic acid, hydroxycarboxylic acids such as glycolic acid, hydroxypropionic acid, hydroxybutyric acid, hydroxyvaleric acid, hydroxycaproic acid and hydroxybenzoic acid, lactones such as caprolactone, valerolactone, propiolactone, undecalactone and 1,5-oxepan-2-one, or the like, or a combination comprising at least one of the foregoing dicarboxylic acids). In a copolymer of polylactide it is desirable to have 2 to 70 wt % of the polylactide, based on the total weight of the copolymer.

In an embodiment, the polylactide is a polycarbonate-polylactide diblock copolymer having the structure of formula (25)

(25)

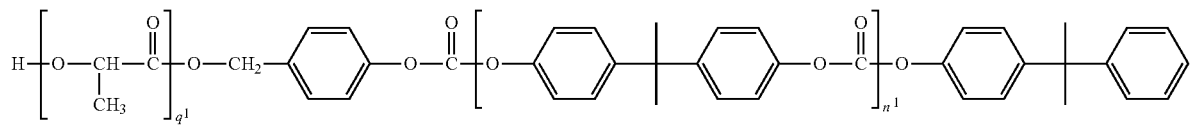

wherein $n_1$ is 20 to 200; and $q_1$ is 50 to 500.

In another embodiment, the polylactide is a polycarbonate-polylactide triblock copolymer having the structure of formula (26):

(26)

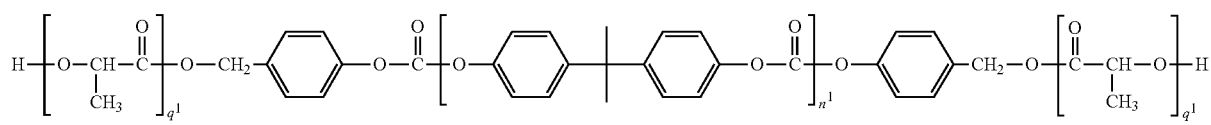

As noted above the flame retardant composition comprises polylactic acid (hereinafter termed a "polylactide"). In an exemplary embodiment, the polylactide is a bio-based polymer. The polylactide is blended with the polycarbonate. In an wherein $n_1$ is 20 to 200; and each occurrence of $q_1$ is 50 to 500.

In yet another embodiment, the polylactide is a polycarbonate-polylactide diblock copolymer having the structure of formula (27)

(27)

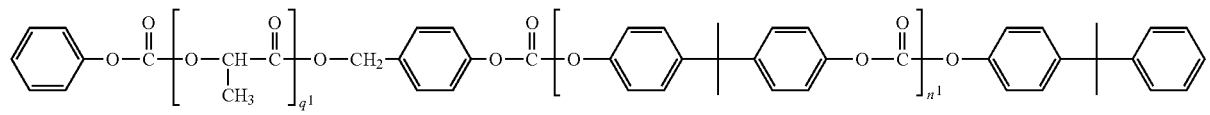

wherein $n_1$ is 20 to 200; and $q_1$ is 50 to 500.

In yet another embodiment, the polylactide is a polycarbonate-polylactide triblock copolymer having the structure of formula (28)

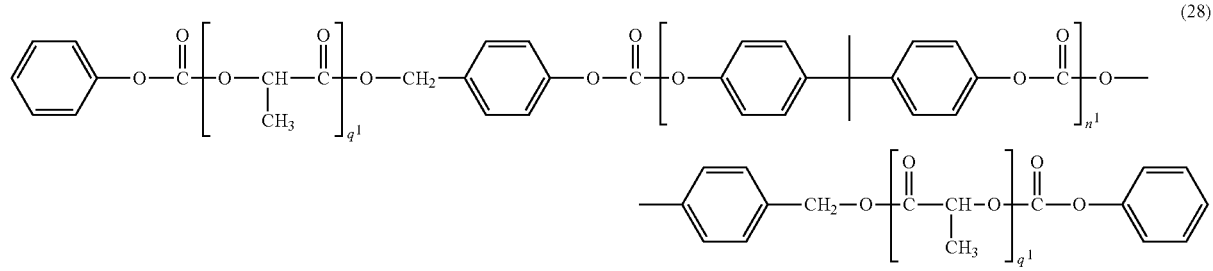

(28)

wherein $n_1$ is 20 to 200; and each occurrence of $q_1$ is 50 to 500.

It is desirable to use a polylactide derived from a lactic acid whose optical purity is high. When the polylactide is derived from a combination of polymers derived from L-lactic acid and from D-lactic acid, it is desirable for the polymers derived from L-lactic acid to be present in an amount of 80 wt % or more or 20 wt % or less, based on the total weight of the polylactide. Conversely, it is desirable for the polymers derived from the D-lactic acid to be present in an amount of 80 wt % or more or 20 wt % or less, based on the total weight of the polylactide.

In an embodiment, when the polylactide is derived from a combination of polymers derived from L-lactic acid and from D-lactic acid, it is desirable for the polymers derived from L-lactic acid to be present in an amount of greater than or equal to 80 wt %, specifically greater than or equal to 85 wt %, specifically greater than or equal to 90 wt %, and more specifically greater than or equal to 98 wt %, based on the total weight of the polylactide. In another embodiment, when the polylactide is derived from a combination of polymers derived from L-lactic acid and from D-lactic acid, it is desirable for the polymers derived from D-lactic acid to be present in an amount of greater than or equal to 80 wt %, specifically greater than or equal to 85 wt %, specifically greater than or equal to 90 wt %, and more specifically greater than or equal to 98 wt %, based on the total weight of the polylactide. In an embodiment, when the polylactide is derived from a combination of polymers derived from L-lactic acid and from D-lactic acid, it is desirable for the polymers derived from L-lactic acid to be present in an amount of 50 wt % and the polymers derived from D-lactic acid to be present in an amount of 50 wt %.

The polylactide may comprise modified polylactides such as a maleic anhydride modified polylactide, an epoxy modified polylactide, an amine modified polylactide, or the like, or a combination comprising at least one of the foregoing polylactides.

It is desirable for the weight average molecular weight of the polylactide to be 10,000 to 350,000 Daltons, specifically 30,000 to 250,000 Daltons and more specifically 100,000 to 200,000 Daltons. The weight average molecular weight is determined by polystyrene-equivalent molecular weight measured by a gel-permeation chromatography (GPC). In an exemplary embodiment, the weight average molecular weight of the polylactide is 100,000 to 200,000 Daltons as measured using GPC (using a polystyrene equivalent molecular weight) in conjunction with refractive index measurements.

It is desirable for the melting temperature of the polylactide to be greater than or equal to 120° C., and more specifically greater than or equal to 150° C. Since the melting temperature of the polylactide increases with its optical purity increases, it is desirable to use a high optical purity polylactide.

It is generally desirable to use the polylactide in amounts of 5 to 50 wt %, specifically 8 to 30 wt %, and more specifically 9 to 20 wt %, based on the total weight of the flame retardant composition.

In an embodiment, the flame retardant composition may comprise an anti-drip agent. Fluorinated polyolefin and/or polytetrafluoroethylene may be used as an anti-drip agent. Anti-drip agents may also be used, for example a fibril forming or non-fibril forming fluoropolymer such as polytetrafluoroethylene (PTFE). The anti-drip agent may be encapsulated by a rigid copolymer such as, for example styrene acrylonitrile (SAN). PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be preblended in some manner with a second polymer, such as for, example, an aromatic polycarbonate resin or SAN to form an agglomerated material for use as an anti-drip agent. Either method may be used to produce an encapsulated fluoropolymer.

The anti-drip agent may be added in the form of relatively large particles having a number average particle size of 0.3 to 0.7 mm, specifically 0.4 to 0.6 millimeters. The anti-drip agent may be used in amounts of 0.01 wt % to 10 wt %, based on the total weight of the flame retardant composition.

The flame retardant composition may have less than 50 ppm halogen content. The composition may have less than 50 ppm of antimony, lead, cadmium, mercury, arsenic, thallium, or mixtures thereof. The composition may additionally have a notched Izod impact strength at 23° C. of 480 J/m or greater when measured per ASTM D256 and a heat distortion temperature at 1.82 MPa of 75° C. or greater when measured per ASTM D648.

The polycarbonate together with the polylactide and the phenoxyphosphazene flame retardant may generally be processed in several different ways such as, melt blending, solution blending, or the like, or combinations comprising at least one of the foregoing methods of blending. Melt blending of the moldable composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Melt blending involving the aforementioned forces may be conducted in machines such as single or multiple screw extruders, Buss kneader, Henschel, helicones, Ross mixer, Banbury, roll mills, molding machines such as injection molding machines, vacuum forming machines, blow molding machine, or the like, or combinations comprising at least one of the foregoing machines.

In an embodiment, the polycarbonate in powder form, pellet form, sheet form, or the like, may be first dry blended with the polylactide and phenoxyphosphazene (also in powder, pellet or sheet form) in a Henschel or in a roll mill, prior to being fed into a melt blending device such as an extruder or Buss kneader. It may be desirable to introduce the phenoxyphosphazene into the melt blending device in the form of a masterbatch. In such a process, the masterbatch may be introduced into the melt blending device downstream of the point where the organic polymer is introduced.

A melt blend is one where at least a portion of the polycarbonate and/or polylactide has reached a temperature greater than or equal to the melting temperature, if the resin is a semi-crystalline organic polymer, or the flow point (e.g., the glass transition temperature) if the resin is an amorphous resin during the blending process. A dry blend is one where the entire mass of organic polymer is at a temperature less than or equal to the melting temperature if the resin is a semi-crystalline organic polymer, or at a temperature less than or equal to the flow point if the organic polymer is an amorphous resin and wherein organic polymer is substantially free of any liquid-like fluid during the blending process. A solution blend, as defined herein, is one where the polycarbonate and/or polylactide is suspended in a liquid-like fluid such as, for example, a solvent or a non-solvent during the blending process.

The moldable flame retardant composition comprising may be subject to multiple blending and forming steps if desirable. For example, the moldable composition may first be extruded and formed into pellets. The pellets may then be fed into a molding machine where it may be formed into any desirable shape or product. Alternatively, the moldable composition emanating from a single melt blender may be formed into sheets or strands and subjected to post-extrusion processes such as annealing, uniaxial or biaxial orientation.

Solution blending may also be used to manufacture the moldable composition. The solution blending may also use additional energy such as shear, compression, ultrasonic vibration, or the like, to promote homogenization of the flame retardant with the polycarbonate and the polylactide.

The compositions were tested for one or more of the following: UL 94 flame retardance, Izod impact strength, melt viscosity, and heat deflection temperature. The details of these tests used in the examples are known to those of ordinary skill in the art, and may be summarized as follows:

Flammability tests were performed following the procedure of Underwriter's Laboratory Bulletin 94 entitled "Tests for Flammability of Plastic Materials, UL 94". Several ratings can be applied based on the rate of burning, time to extinguish, ability to resist dripping, and whether or not drips are burning. Samples for testing are bars having dimensions of 125 mm length×13 mm width by no greater than 13 mm thickness. Bar thicknesses were 0.6 mm or 0.8 mm. Materials can be classified according to this procedure as UL 94 HB (horizontal burn), V0, V1, V2, 5VA and/or 5VB on the basis of the test results obtained for five samples; however, the compositions herein were tested and classified only as V0, V1, and V2, the criteria for each of which are described below.

V0: In a sample placed so that its long axis is 180 degrees to the flame, the period of flaming and/or smoldering after removing the igniting flame does not exceed ten (10) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 50 seconds.

V1: In a sample placed so that its long axis is 180 degrees to the flame, the period of flaming and/or smoldering after removing the igniting flame does not exceed thirty (30) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 250 seconds.

V2: In a sample placed so that its long axis is 180 degrees to the flame, the average period of flaming and/or smoldering after removing the igniting flame does not exceed thirty (30) seconds, but the vertically placed samples produce drips of burning particles that ignite cotton. Five bar flame out time is the flame out time for five bars, each lit twice, in which the sum of time to flame out for the first (t1) and second (t2) ignitions is less than or equal to a maximum flame out time (t1+t2) of 250 seconds.

In an embodiment, the flame retardant compositions are of particular utility in the manufacture flame retardant articles that pass the UL94 vertical burn tests, in particular the UL94 5VB standard. In the UL94 vertical burn test, a flame is applied to a vertically fastened test specimen placed above a cotton wool pad. To achieve a rating of 5VB, burning must stop within 60 seconds after five applications of a flame to a test bar, and there can be no drips that ignite the pad. Various embodiments of the compositions described herein meet the UL94 5VB standard.

Melt Volume Rate (MVR) is used to determine the flowability of plastic melt. MVR was determined at 260° C. using 2.16 kg of load with a dwell time of 360 s per ASTM D1238. The results are reported in $cm^3/10$ min.

Izod Impact Strength is used to compare the impact resistances of plastic materials. NII was determined at 23° C. using a 3.2-mm thick, molded, notched Izod impact bar. It was determined per ASTM D256. The results are reported in joules/meter.

Heat deflection temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. HDT was determined when measured at 1.82 MPa loading with a sample thickness of 3.2 millimeters. Results are reported in degree centigrade.

The composition is exemplified by the following examples.

EXAMPLES

The following example demonstrates the flame retardant composition and methods of manufacturing it. The ingredients used in the flame retardant composition are shown in the Table 1 below. As can be seen, the polycarbonate is a blend of two polycarbonate homopolymers, one having a molecular weight of 21,900 Daltons and the other having a molecular weight of 29,900 Daltons. The phosphazene compound was used in an amount of 10 wt %, based on the total weight of the composition.

TABLE 1

| # | Item | Description | Supplier | Tradename |
|---|------|-------------|----------|-----------|
| 1 | PC1 | Polycarbonate homopolymer with a Mw of 21,900 | SABIC | LEXAN* |
| 2 | PC2 | Polycarbonate homopolymer with a Mw of 29,900 | SABIC | LEXAN* |
| 3 | PLA-1 | Poly(Lactic Acid) INGEO 4032D | NatureWorks | INGEO |
| 4 | PLA-2 | Poly(Lactic Acid) INGEO 2003D | NatureWorks | INGEO |
| 5 | ABS | SAN grafted emulsion ABS with butadiene content~50% | SABIC | CYCOLAC* |
| 6 | SAN | Styrene-Acrylonitrile Copolymer | | |
| 7 | MR | Mold Release, pentaerithritol tetrastearate | LONZA Spa | GLYCOLUBE P |
| 8 | STAB1 | tris(2,4-di-t-butylphenyl)phosphite | CIBA | IRGAFOS 168 |
| 9 | STAB2 | Octadecyl3(3,5ditertbutyl4hydroxyphenyl)propionate | CIBA/BASF | IRGANOX 1076 |
| 10 | FR1 | Resorcinol Diphosphate | ICL-SUPRESTA | |
| 11 | FR2 | Poly(tetrafluoroethylene):Styrene-Acrylonitrile 50:50 | SABIC | |
| 12 | FR3 | Phenoxyphosphazene | Otsuka | SPB-100 |
| 13 | FR4 | BPADP | ICL-SUPRESTA | |
| 13 | F1 | Fine Talc $Mg_3Si_4O_{10}(OH)_2$ | IMERYS | |

The processing conditions, molding conditions, compositions and properties are shown in the Tables 2, 3, 4 and 5 respectively.

The compounding was conducted on a WP 7 barrel 30 mm twin-screw extruder having 7 barrels. The temperature for each of the barrels is detailed in the Table 2. The molding conditions are detailed in the Table 3.

TABLE 2

| Parameters | Unit of Measure | Settings |
|---|---|---|
| Compounder Type | NONE | Twin Screw Extruder |
| Zone 1 Temp | ° F. | 350 |
| Zone 2 Temp | ° F. | 455 |
| Zone 3 Temp | ° F. | 505 |
| Zone 4 Temp | ° F. | 525 |
| Zone 5 Temp | ° F. | 525 |
| Zone 6 Temp | ° F. | 525 |
| Zone 7 Temp | ° F. | 525 |
| Screw speed | rpm | 500 |
| Throughput | kg/hr | 40-60 |
| Vacuum | MPa | −0.1 |

The polycarbonate, polylactide and the impact modifier were fed from main throat from upper stream. All additives (mold release agent, antioxidants, and the like) were pre-blended with the polycarbonate powder in a super blender and then fed into the extruder. The molding conditions are detailed in the Table 3.

TABLE 3

| Parameter | Unit of Measure | Settings |
|---|---|---|
| Pre-drying time | Hour | 4 |
| Pre-drying temp | ° F. | 175 |
| Zone 1 temp | ° F. | 470 |
| Zone 2 temp | ° F. | 470 |
| Zone 3 temp | ° F. | 470 |
| Zone 4 temp | ° F. | 470 |
| Nozzle temp | ° F. | 470 |
| Mold temp | ° F. | 150 |
| Screw speed | rpm | 100 |
| Back pressure | PSI | 75 |
| Cooling time | s | 18 |
| Injection speed(mm/s) | in/s | 2 |
| Holding pressure | PSI | 1100 |
| Max. Injection pressure | PSI | 1100 |

The composition along with the properties is detailed in the Table 4. The compositions of Table 4 are all comparative compositions as they do not contain the phenoxyphosphazene flame retardants. The test standards for which the properties were measured are detailed in the Table 5.

The compositions were all compounded from twin-screw extruder, and the pellets were collected for evaluation and molding. In the Table 4 below, Sample #s 1-3 are comparative samples, while Sample #s 4 and 5 include the disclosed compositions.

TABLE 4

| Item Description | Unit | Sample #1* | Sample #2* | Sample #3* | Sample #4 | Sample #5 |
|---|---|---|---|---|---|---|
| PC1 | wt % | 49.35 | 42.2 | 37.2 | 49.35 | 19.95 |
| PC2 | wt % | 16.45 | 21.1 | 21.1 | 16.45 | 43.85 |
| PLA-1 | wt % |  | 15 | 20 |  | 15 |
| PLA-2 | wt % | 15 |  |  | 15 |  |
| ABS | wt % | 6 | 6 | 6 | 6 | 6 |
| SAN | wt % |  |  |  |  | 4 |
| FR1 | wt % | 10 |  |  |  |  |
| FR2 | wt % | 0.75 | 0.75 | 0.75 | 0.75 | 0.75 |
| FR3 | wt % |  |  |  | 10 | 10 |
| FR4 | wt % |  | 12.5 | 12.5 |  |  |
| MR | wt % | 0.2 | 0.2 | 0.2 | 0.2 | 0.2 |
| STAB2 | wt % | 0.15 | 0.15 | 0.15 | 0.15 | 0.15 |
| STAB1 | wt % | 0.1 | 0.1 | 0.1 | 0.1 | 0.1 |
| F1 | wt % | 2 | 2 | 2 | 2 |  |
| Total | wt % | 100 | 100 | 100 | 100 | 100 |
| MVR 260/2.16/360 | cm$^3$/10 min | 17.2 | 15.97 | 14.94 | 15.9 | 13.4 |
| HDT 1.82 MPa/3.2 mm | ° C. | 77.5 | 80.3 | 79 | 91.4 | 91.5 |
| Notched Izod 23 C. | J/m | 58.8 | 53.3 | 52.5 | 265 | 605 |
| Un-notched Izod 23 C. | J/m | No break | No break | No break | No break | No break |
| MAI Emax | J | 51.6 | 55.6 | 52.5 | 52 | — |
| UL 94 @ 1.5 mm | — | V2 | V0 | V2 | V2 | — |
| UL 94 @ 2.0 mm | — | V0 | V0 | V0 | V0 | V0 |
| UL 94 @ 2.5 mm | — | V0 | V0 | V0 | V0 | V0 |
| UL 94 @ 3.0 mm | — | 5VB | 5VB | 5VB | 5VB | — |

*Comparative compositions

From the Table 4 is may be seen that the compositions of Sample #s 4 and 5 display superior impact properties (notched Izod) and higher heat distortion temperatures when compared with the comparative compositions. From the examples above it may be seen that the flame retardant composition displays a heat distortion temperature greater than 85° C., specifically greater than 90° C., while at the same time displaying a notched Izod impact strength of greater than or equal to 250 joules/meter, specifically greater than or equal to 400 joules/meter, and specifically greater than or equal to 500 joules/meter. The impact strength of the flame retardant composition is at least 100% greater than the impact strength of comparative compositions that contain all the same ingredients in the same amounts except for the presence of the phenoxyphosphazene flame retardants.

The flame retardant compositions that utilize the phenoxyphosphazene flame retardant display a flame retardancy of V-0 when measured as per the UL-94 protocol. The composition has a MVR of at least 13 cc/10 minutes when measured at 260° C./2.16 Kg per ASTM D1238 and a UL-94 rating of at least V-0 at 2.0 mm, specifically at 2.5 mm and more specifically at 3.0 mm.

As may be seen in the example above, the flame retardant composition has a flame retardancy of V-0, V-1 or V-2, at various thicknesses when tested according to the UL-94 protocol. The sample thickness can be 0.3 millimeter or less, specifically 0.4 millimeter or less, specifically 0.8 millimeter or less, specifically 1.0 mm or less, specifically 1.2 mm or less, specifically 1.5 mm or less, specifically 1.8 mm or less, specifically 2.0 mm or less, specifically 3.0 mm or less.

In another embodiment, the flame retardant composition can have a flame retardancy of V-0, V-1 or V-2, at various thicknesses when tested according to the UL94 protocol. The sample thickness can be 0.3 millimeter or greater, specifically 0.4 millimeter or greater, specifically 0.8 millimeter or greater, specifically 1.0 mm or greater, specifically 1.2 mm or greater, specifically 1.5 mm or greater, specifically 1.8 mm or greater, specifically 2.0 mm or greater, when tested according to the UL94 protocol. At all of these thicknesses the flame retardant composition can display a flame retardancy of V-0, V-1 or V-2 depending the selected composition.

In general, the compositions and articles disclosed herein can alternatively comprise, consist of, or consist essentially of, any appropriate components herein disclosed. The compositions and articles can additionally, or alternatively, be formulated so as to be devoid, or substantially free, of any components, materials, ingredients, adjuvants or species used in the prior art compositions or that are otherwise not necessary to the achievement of the function and/or objectives of the present compositions.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." Reference throughout the specification to "one embodiment," "another embodiment", "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A flame retardant composition comprising:
   a polycarbonate;
   a polylactide; and
   a flame retardant; where the flame retardant is a phosphazene compound, a di- or polyfunctional aromatic phosphorus-containing compound, or a combination comprising at least one of the foregoing flame retardants; where the polycarbonate comprises a first polycarbonate homopolymer and a second polycarbonate homopolymer; where first polycarbonate homopolymer has a weight average molecular weight of 15,000 to 25,000 Daltons and is present in an amount of 15 to 55 wt %, based on the total weight of the flame retardant composition; and where the second polycarbonate homopolymer has a weight average molecular weight of 25,000 to 40,000 Daltons and is present in an amount of 15 to 55 wt %, based on the total weight of the flame retardant composition.

2. The flame retardant composition of claim 1, where the polycarbonate comprises bisphenol A carbonate units and is present in an amount of 30 to 90 wt % based on a total weight of the flame retardant composition.

3. The flame retardant composition of claim 1, where the polycarbonate is branched and is present in an amount of 30 wt % to 80 wt %, based on a total weight of the flame retardant composition.

4. The flame retardant composition of claim 1, where the phosphazene compound is present in an amount of 1 to 20 wt %, based on a total weight of the flame retardant composition.

5. The composition of claim 1, where the phosphazene compound has the structure of formula (21)

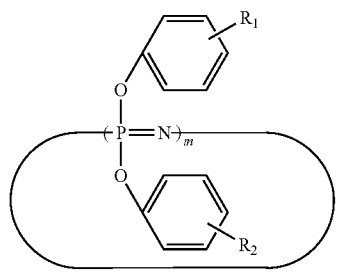

(21)

where in the formula (21), m represents an integer of 3 to 25, $R_1$ and $R_2$ are the same or different and are independently a hydrogen, a hydroxyl, a $C_{7-30}$ aryl group, a $C_{1-12}$ alkoxy, or a $C_{1-12}$ alkyl.

6. The composition of claim 1, where the phosphazene compound is phenoxy cyclotriphosphazene, octaphenoxy cyclotetraphosphazene, decaphenoxy cyclopentaphosphazene, or a combination comprising at least one of the foregoing phosphazene compounds.

7. The composition of claim 1, where the phosphazene compound has the structure of formula (22)

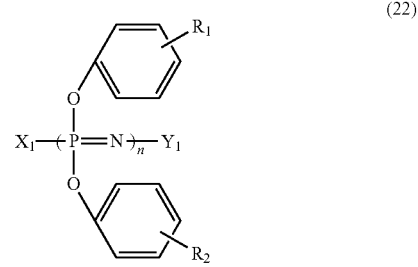

(22)

where in the formula (22), $X^1$ represents a —N=P(OPh)$_3$ group or a —N=P(O)OPh group, $Y^1$ represents a —P(OPh)$_4$ group or a —P(O)(OPh)$_2$ group, n represents an integer from 3 to 10000, Ph represents a phenyl group, $R_1$ and $R_2$ are the same or different and are independently a hydrogen, a hydroxyl, a $C_{1-12}$ alkoxy, or a $C_{1-12}$ alkyl.

8. The composition of claim 1, where the phosphazene compound is a crosslinked phenoxyphosphazene.

9. The composition of claim 1, where the phosphazene compound is a phenoxyphosphazene.

10. The composition of claim 1, where the phosphazene compound has a structure represented by the formula (24)

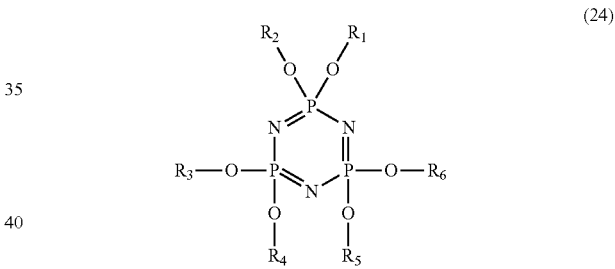

(24)

where $R_1$ to $R_6$ can be the same of different and can be an aryl group, an aralkyl group, a $C_{1-12}$ alkoxy, a $C_{1-12}$ alkyl, or a combination thereof.

11. The composition of claim 1, where the phosphazene compound has a structure represented by the formula (25)

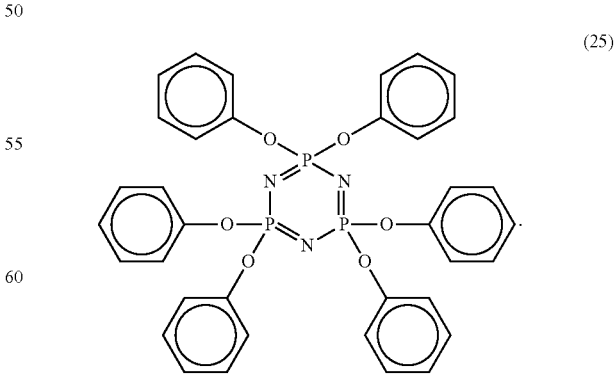

(25)

12. The composition of claim 1, where the flame retardant composition further comprises an anti-drip agent.

13. The composition of claim 1, where the composition has a flame retardancy of V-0 at a thickness of 2.5 millimeter or lower when measured as per a UL-94 protocol.

14. The composition of claim 1, where the composition has a flame retardancy of V-0 at a thickness of 2.0 millimeter or lower when measured as per a UL-94 protocol.

15. The composition of claim 1, where the polylactide is a derived from the polymerization of L-lactic acid and/or from the polymerization of D-lactic acid.

16. The composition of claim 1, where the polylactide is present in an amount of 5 to 50 wt %, based on the total weight of the flame retardant composition.

17. The composition of claim 1, where the polylactide is present in an amount of 8 to 20 wt %, based on the total weight of the flame retardant composition.

18. The composition of claim 1, where the aromatic phosphorus-containing compound is resorcinol di-phosphate or bisphenol A di-phosphate.

19. The composition of claim 1, where the flame retardant composition comprises up to 25 wt % of an impact modifier, based on the total weight of the flame retardant composition.

20. The composition of claim 1, where the composition has a flame retardancy of V-0 at a thickness of less than or equal to 3.0 mm when measured as per UL-94 and a notched Izod impact strength of greater than or equal to 200 joules per meter when measured as per ASTM D 256.

21. The composition of claim 1, where the composition has a flame retardancy of V-0 at a thickness of less than or equal to 1.5 mm when measured as per UL-94 and a notched Izod impact strength of greater than or equal to 90 joules per meter when measured as per ASTM D 256.

22. A method comprising:
combining a polycarbonate, a polylactide, and a flame retardant to form a flame retardant composition; where the flame retardant is a phosphazene, a di- or polyfunctional aromatic phosphorus-containing compound, or a combination comprising at least one of the foregoing flame retardants; where the polycarbonate comprises a first polycarbonate homopolymer and a second polycarbonate homopolymer; where first polycarbonate homopolymer has a molecular weight of 15,000 to 25,000 Daltons and is present in an amount of 15 to 55 wt %, based on the total weight of the flame retardant composition; and where the second polycarbonate homopolymer has a weight average molecular weight of 25,000 to 40,000 Daltons and is present in an amount of 15 to 55 wt %, based on the total weight of the flame retardant composition.

23. The method of claim 22, further comprising combining an impact modifier.

24. The method of claim 22, further comprising combining an antidrip agent.

25. The method of claim 22, further comprising molding the flame retardant composition.

26. A flame retardant composition comprising:
a polycarbonate;
a polylactide; and
a flame retardant; where the flame retardant is a phosphazene compound has a structure represented by the formula (25)

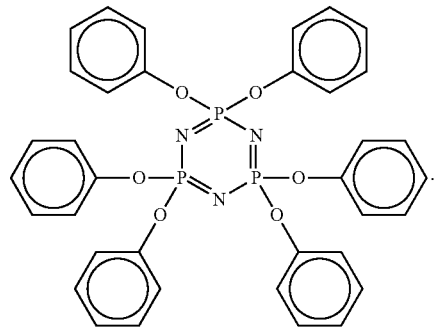

27. The flame retardant composition of claim 26, where the polycarbonate comprises bisphenol A carbonate units and is present in an amount of 30 to 90 wt % based on a total weight of the flame retardant composition.

28. The flame retardant composition of claim 26, where the polycarbonate comprises a first polycarbonate homopolymer and a second polycarbonate homopolymer; where first polycarbonate homopolymer has a molecular weight of 15,000 to 25,000 Daltons and is present in an amount of 15 to 55 wt %, based on the total weight of the flame retardant composition; and where the second polycarbonate homopolymer has a molecular weight of 25,000 to 40,000 Daltons and is present in an amount of 15 to 55 wt %, based on the total weight of the flame retardant composition.

29. The flame retardant composition of claim 26, where the phosphazene compound is present in an amount of 1 to 20 wt %, based on a total weight of the flame retardant composition.

30. The composition of claim 26, where the polylactide is a derived from the polymerization of L-lactic acid and/or from the polymerization of D-lactic acid.

31. The composition of claim 26, where the polylactide is present in an amount of 5 to 50 wt %, based on the total weight of the flame retardant composition.

32. An article comprising the composition of claim 26.

* * * * *